UNITED STATES PATENT OFFICE.

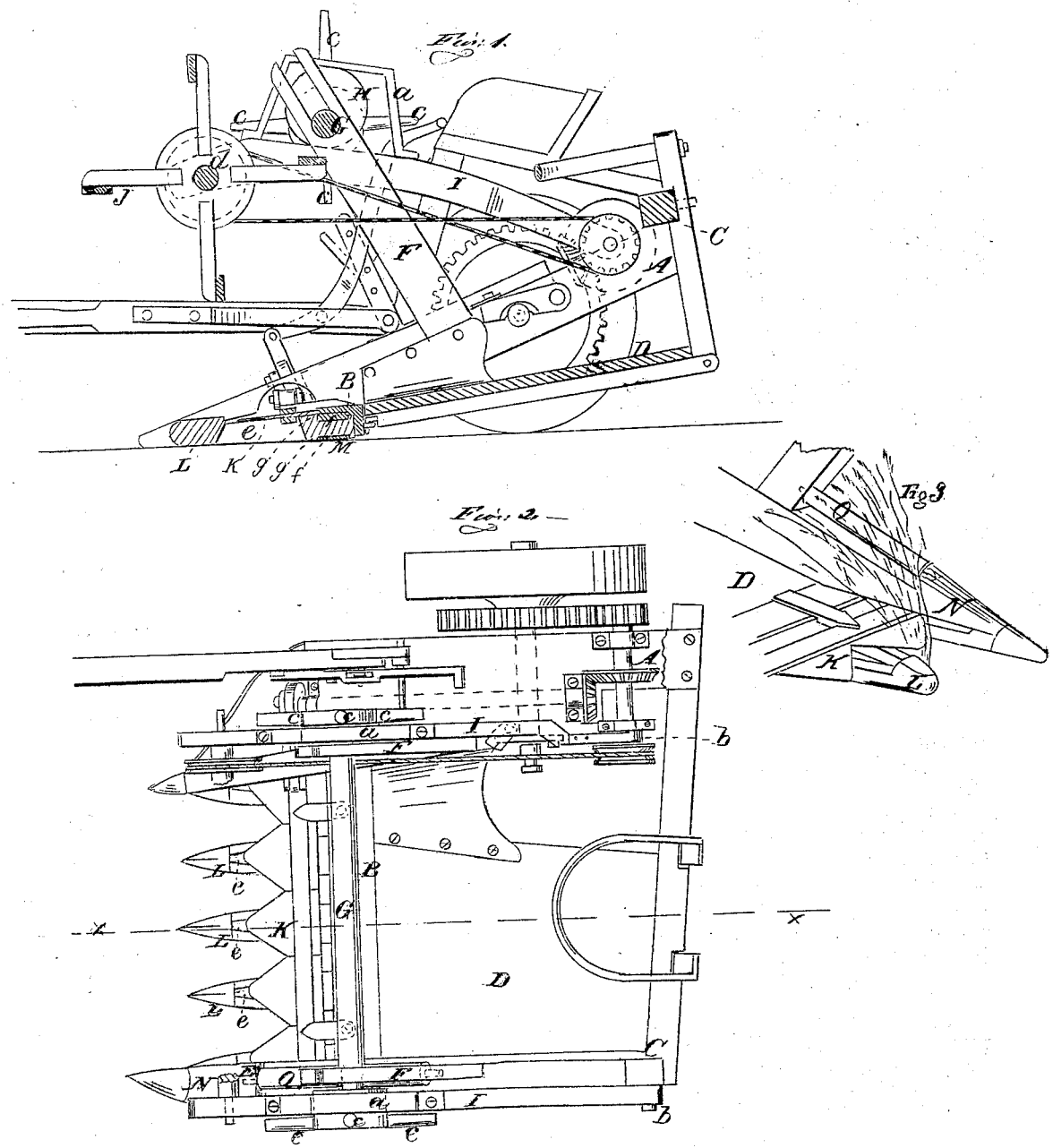

JOHN WOODY, OF MOUNT VERNON, INDIANA.

IMPROVEMENT IN HARVESTERS.

Specification forming part of Letters Patent No. 21,792, dated October 12, 1858.

*To all whom it may concern:*

Be it known that I, JOHN WOODY, of Mount Vernon, in the county of Posey and State of Indiana, have invented certain new and useful Improvements in Harvesters; and I do hereby declare that the following is a full, clear, and exact description of the same, reference being had to the annexed drawings, making a part of this specification, in which—

Figure 1 is a vertical section of my invention, taken in the line $x\ x$, Fig. 2. Fig. 2 is a plan or top view of the same. Fig. 3 is a detached perspective view of the wing or divider.

Similar letters of reference indicate corresponding parts in the several figures.

This invention consists, first, in a peculiar means employed for raising and lowering the reel and retaining the same at any desired height; and, second, in a wing or divider of peculiar construction, all of which are hereinafter fully shown and described:

To enable those skilled in the art to fully understand and construct my invention, I will proceed to describe it.

A represents the main frame of the harvester, and B is the finger-bar, attached thereto at right angles.

C is a frame which is attached to the main frame A. To the frame C the platform D and wing or divider E are attached.

F F are two inclined bars, one of which is attached to the main frame A, and the other is attached to the outer side of the frame C. The upper ends of the bars F F are slotted longitudinally for a short distance, and the ends of a shaft, G, are fitted therein. To each end of the shaft G an eccentric, H, is attached, and these eccentrics are fitted in yokes $a\ a$, attached to arms I I, the back ends of which are pivoted to the machine, as shown at $b\ b$. Each eccentric H has handles $c$ attached to it, and between the outer ends of the arms I I the shaft $d$ of a reel, J, is secured.

The reel is of usual construction, and is placed in the ordinary position relatively with the sickle K.

It will be seen that by grasping the handles of either of the eccentrics the reel may be raised or lowered, as the eccentric will actuate the yoke $a$, and consequently the arms I I, between which the reel is hung or placed. The eccentrics also will retain the reel at any desired point in the scope of its movement, as the eccentrics will not turn casually. The eccentrics, as regards their operation on the reel, will be clearly understood by referring to Fig. 1.

N is a wing or divider, which is attached to the outer part of the frame C. This wing or divider projects a trifle beyond the ends of the fingers, and is of pointed form, as shown clearly in Fig. 3. On the wing or divider a roller, O, is placed, said roller being on the upper part of the wing and its front end nearly in line with the front part of the sickle K. The roller O is inclined and extends some distance back of the finger-bar and sickle. This roller renders the wing or divider far more efficient than usual, for all grain that falls transversely on the roller will, as soon as cut, readily fall on the platform, the roller diminishing friction, and by thus acting serving to keep the platform free from irregular-placed grain, and thereby preventing it being obstructed. This roller is a great improvement, and will act most efficiently, preventing the cut grain from resting on the wing or divider equally as well as the special vibrating or mechanical devices that have been employed for such purpose.

Having thus described my invention, what I claim as new, and desire to secure by Letters Patent, is—

1. Placing the reel J between arms I I, which have their back ends pivoted to the machine and their front ends connected with the eccentrics H H on the shaft G by means of the yokes $a\ a$, substantially as and for the purpose set forth.

2. The roller O, attached to the upper part of the wing or divider N, as and for the purpose set forth.

JOHN WOODY.

Witnesses:
NOBLE CRAIG,
A. C. McCALLISTER.